Sept. 18, 1962 J. W. GLAZE, JR., ET AL 3,054,542

STOCKING HANDLING APPARATUS

Filed March 15, 1960 9 Sheets-Sheet 1

INVENTORS
JAMES C. WILSON
JOHN W. GLAZE, JR.
BY Mead, Browne, Schuyler & Beveridge
ATTORNEYS

STOCKING HANDLING APPARATUS

Filed March 15, 1960

INVENTORS
JAMES C. WILSON
JOHN W. GLAZE, JR.
BY
Mead, Browne, Schuyler & Beveridge
ATTORNEYS Sept. 18, 1962 J. W. GLAZE, JR., ET AL 3,054,542

STOCKING HANDLING APPARATUS

Filed March 15, 1960 9 Sheets-Sheet 3

INVENTORS
JAMES C. WILSON
JOHN W. GLAZE, JR

BY Mead, Browne, Schuyler & Beveridge
ATTORNEYS

Sept. 18, 1962 J. W. GLAZE, JR., ET AL 3,054,542

STOCKING HANDLING APPARATUS

Filed March 15, 1960 9 Sheets-Sheet 4

INVENTORS
JAMES C. WILSON
JOHN W. GLAZE, JR.

BY Mead, Browne, Schuyler & Beveridge
ATTORNEYS

INVENTORS
JAMES C. WILSON
JOHN W. GLAZE, JR.
BY
Mead, Browne, Schuyler & Beveridge
ATTORNEYS Sept. 18, 1962 J. W. GLAZE, JR., ET AL 3,054,542

STOCKING HANDLING APPARATUS

Filed March 15, 1960 9 Sheets-Sheet 6

INVENTORS
JAMES C. WILSON
JOHN W. GLAZE, JR.

BY Mead, Browne, Schuyler & Beveridge
ATTORNEYS

INVENTORS
JAMES C. WILSON
JOHN W. GLAZE, JR.
BY
Mead, Browne, Schuyler & Beveridge
ATTORNEYS Sept. 18, 1962 J. W. GLAZE, JR., ET AL 3,054,542

STOCKING HANDLING APPARATUS

Filed March 15, 1960 9 Sheets-Sheet 8

INVENTORS
JAMES C. WILSON
JOHN W. GLAZE, JR.
BY
Mead, Browne, Schuyler & Beveridge
ATTORNEYS Sept. 18, 1962 J. W. GLAZE, JR., ET AL 3,054,542

STOCKING HANDLING APPARATUS

Filed March 15, 1960 9 Sheets-Sheet 9

INVENTORS
JAMES C. WILSON
JOHN W. GLAZE, JR.
BY
Mead, Browne, Schuyler & Beveridge
ATTORNEYS United States Patent Office 3,054,542

Patented Sept. 18, 1962

3,054,542

STOCKING HANDLING APPARATUS

John W. Glaze, Jr., and James C. Wilson, Charlotte, N.C., assignors to Autoboard Corporation, Inc., Charlotte, N.C., a corporation of North Carolina Filed Mar. 15, 1960, Ser. No. 15,132
23 Claims. (Cl. 223—112)

This invention relates to stocking handling apparatus, and more particularly to apparatus for automatically trimming, boarding, and collecting stockings.

It is a primary object of the invention to provide apparatus for continuously conveying stockings through a boarding chamber and stripping and collecting stockings as they emerge from the chamber by mechanisms substantially independent of the particular size of the stockings being handled.

It is another object of the invention to provide apparatus for receiving stockings from a boarding chamber and collecting the stockings in flat, generally vertical side by side relationship.

It is another object of the invention to provide an automatic boarding machine wherein stockings are automatically trimmed during their progress through the machine.

Still another object of the invention is to provide an automatic boarding machine wherein a plurality of stocking receiving forms are driven along an endless path at different rates during different portions of the path.

In the achievement of the foregoing, and other objects, the apparatus includes a plurality of flat, vertically disposed stocking receiving forms mounted for movement along an endless rectangular path. One of the longer sides of the path extends through a boarding chamber and the forms are driven along this side of the path in step by step movement. Pusher pins uniformly spaced along a continuously driven endless chain drive the forms along the remaining three sides of the path. These pins engage the form assemblies so that at the corners of the path the forms remain stationary momentarily while the pins shift from engagement with one side of the forms to an engagement with an adjacent side. During the momentary pause of each form at one corner of the path, a stripper mechanism grips the stocking supported upon the form and moves upwardly along an inclined arm to strip the stocking from the form and carry the stocking to a location remote from the path of travel of the forms. When the stripper assembly reaches the upper end of the arm, it is temporarily latched as a collector assembly including a pair of horizontal needles is driven toward the stocking. These collector needles pass horizontally through the stocking which is supported by the stripper mechanism in a flat generally vertical position and subsequent to the piercing of the stocking by the needles the grip of the stripper mechanism upon the stocking is released. Then, the needles are retracted from the stripper mechanism and upon clearing the stripper mechanism the latch holding the stripper mechanism at the upper end of the arm is released to permit the stripper to return to the bottom of the arm to collect a subsequent stocking from the next following form. Both the stripper mechanism and collector needle assembly are driven in synchronism with the form driving chain.

At a suitable location along the path of the forms, a continuously driven suction trimmer assembly is located at each side of the form path to trim the upper edge portion of the stocking as the form passes between the two opposed trimmer assemblies.

Other objects and features of the invention will become apparent by reference to the following specification and to the accompanying drawings.

Figure 1:
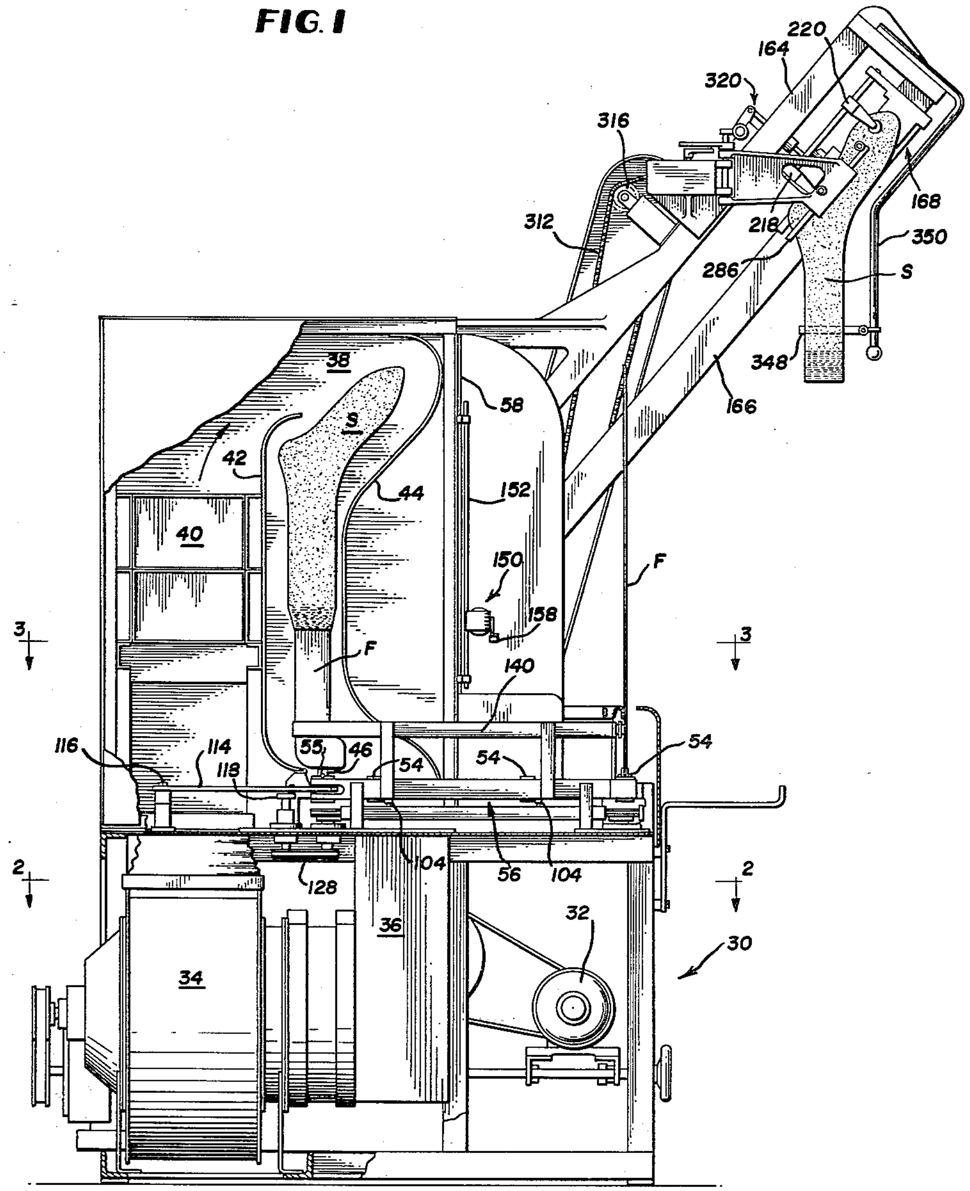
FIG. 1 is a side elevational view of a machine embodying the invention with certain parts broken away or omitted to show structural details.
Figure 2:
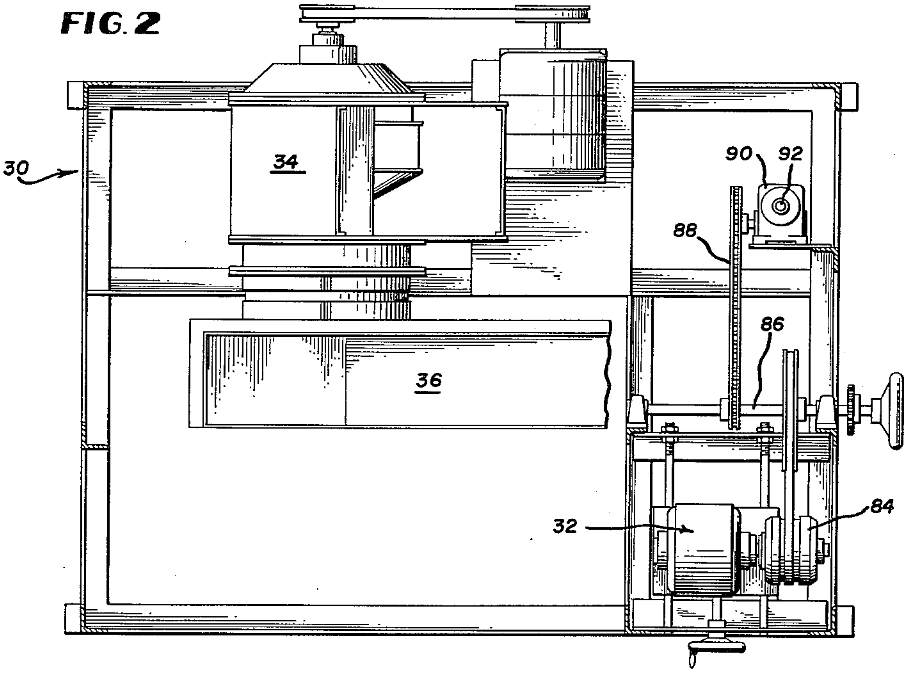
FIG. 2 is a cross-sectional view of the machine of FIG. 1 taken approximately on the line 2—2 of FIG. 1 with certain parts omitted or broken away.

Referring first to FIGS. 1 through 4, a machine embodying the present invention includes a suitably designed frame and cabinet assembly designated generally 30, the structural details of which are not critical to the present invention. The lower portion of cabinet assembly 30 serves as a housing for a drive assembly including a main drive motor 32, a blower 34 and an inlet duct designated generally 36 connected to the inlet side of blower 34. The upper portion of cabinet 30 is recessed somewhat at the front (right hand side of FIG. 1) and serves to enclose, at the upper rear portion of the machine, a boarding chamber 38. A steam coil assembly designed generally 40 is mounted in the path of air issuing from blower 34 and transverse sheet metal guides 42 and 44 extend transversely across boarding chamber 38 to guide the flow of air heated by steam coils 40 past a plurality of stockings individually supported upon stocking receiving forms F within boarding chamber 38.

Figure 3:
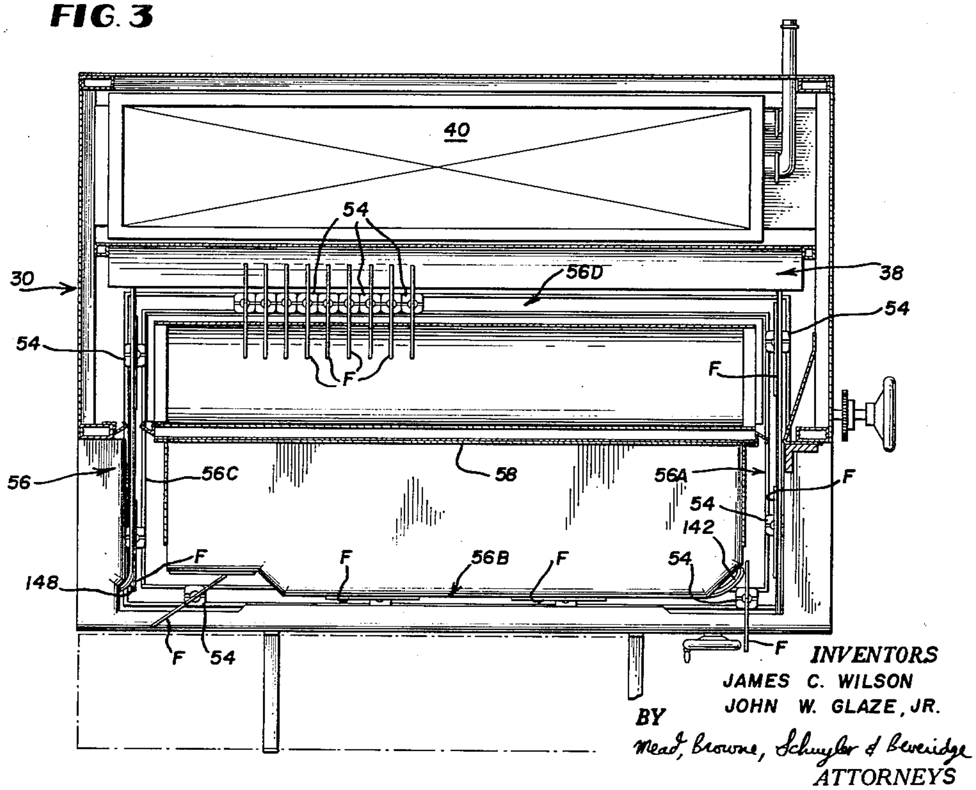
FIG. 3 is a cross-sectional view of the machine of FIG. 1 taken approximately on line 3—3, with certain parts omitted.
Figure 4:
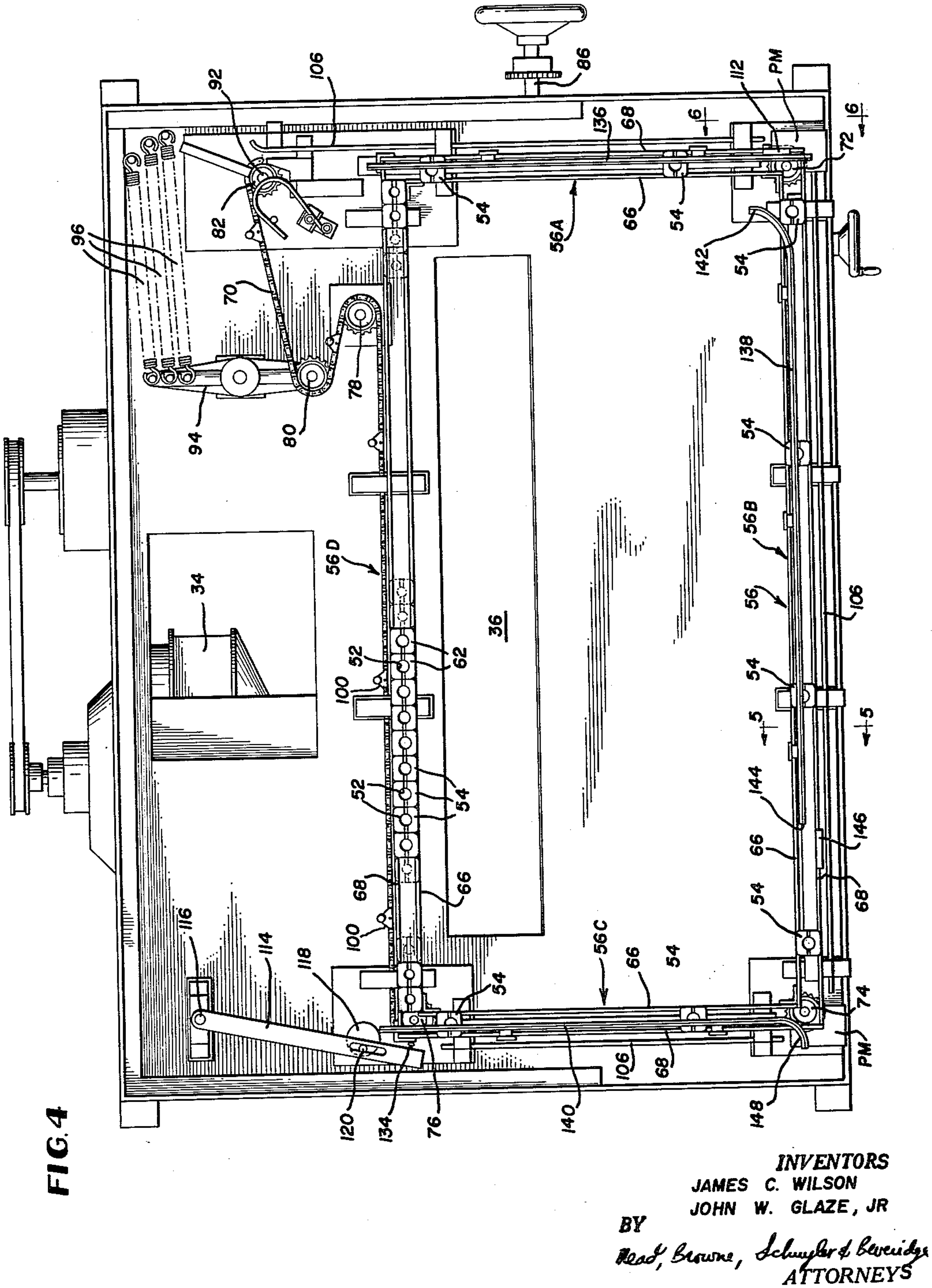
FIG. 4 is top plan view of the machine with the boarding chamber, stripper mechanism, and cover plates removed, showing details of the form driving mechanism.

Each of the stocking receiving forms F is cut from a flat sheet of aluminum or similar material. At the lower end of each form, a short cylindrical rod 46 (FIGS. 5 and 6) is formed with a flattened face 48 at its upper end to which the form F is fixedly secured as by nut and bolt assemblies 50. Rod 46 is slidably received in a vertical bore 52 in a form supporting block 54 of substantially square horizontal cross section, passage of rod 46 through bore 52 being limited by the engagement of a cross pin 55 with the top of block 54. Form blocks 54 are supported, in a manner to be described below, for movement along an endless track assembly 56 which defines, as best seen in FIGS. 3 and 4, a horizontal rectangular path having sides 56A, 56B, 56C and 56D along which the form blocks are conveyed during operation of the machine. As best seen from a comparison of FIGS. 1 and 3, approximately one-half of the rectangular path defined by the track assembly 56, i.e. that portion of the track assembly to the rear of front plate 58 of the boarding chamber, extends through the boarding chamber, while forms traversing that portion of the path defined by track assembly 56 forward of front plate 58 are exposed to the machine operator.

Figures 5, 6, 7, 8:
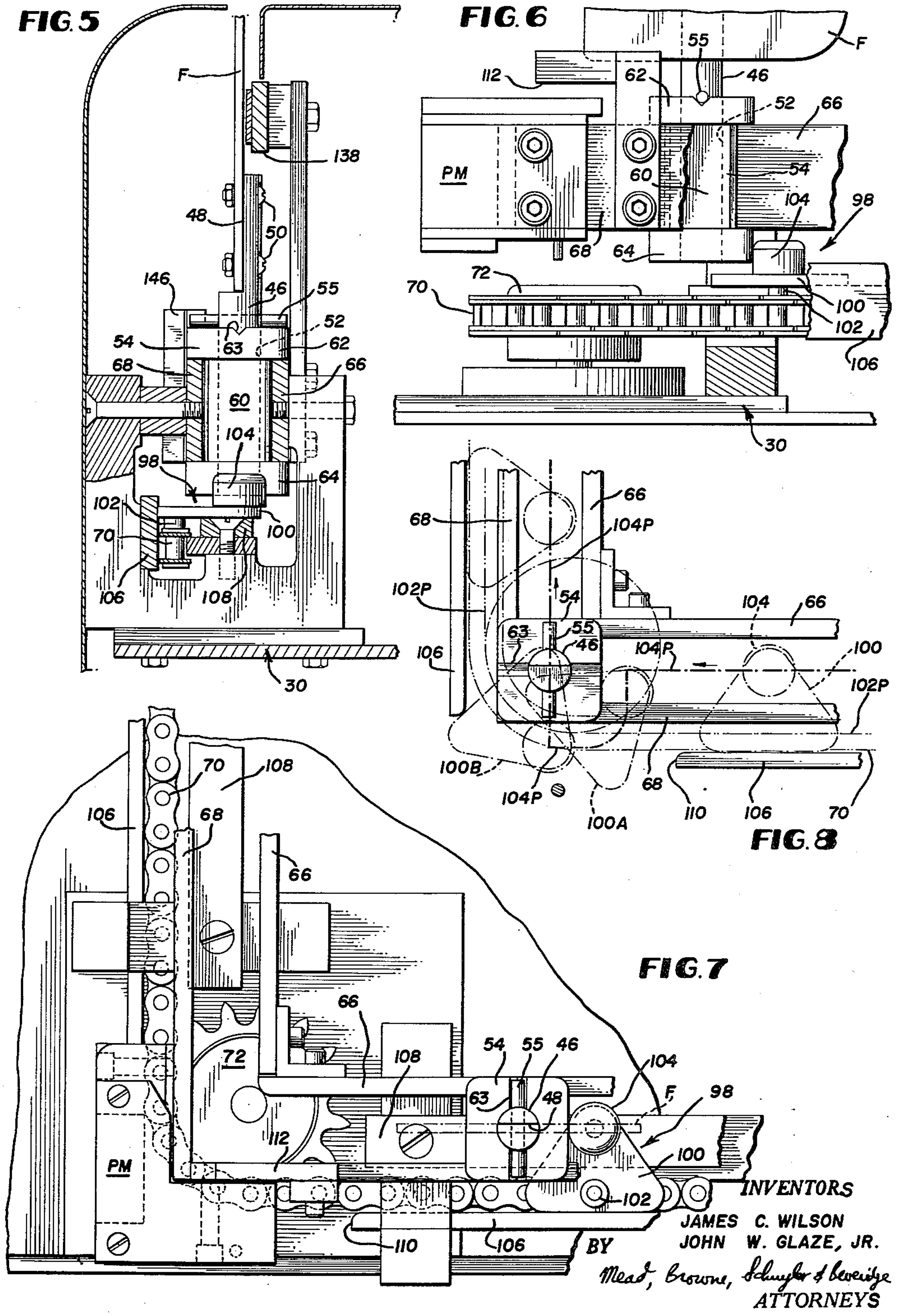
FIG. 5 is a detail cross-sectional view taken on line 5—5 of FIG. 4.
FIG. 6 is a detail cross-sectional view with certain parts broken away, taken approximately on line 6—6 of FIG. 4.
FIG. 7 is a detail plan view of the structure shown in FIG. 6.
FIG. 8 is a simplified plan view similar to FIG. 7, showing the paths of relative movement of various parts.

Each form block 54 consists of a central section 60 of reduced square cross-sectional area and enlarged square cross-sectional area and enlarged square upper and lower flanges 62 and 64. Track assembly 56 includes a pair of horizontally spaced parallel rails 66 and 68 which slidably engage the opposite sides of central portion 60 and the opposed faces of upper and lower flanges 62 and 64. Rails 66 and 68 are fixedly supported from the machine frame 30 by suitable means such as indicated in FIG. 5.

Form blocks 54 are driven along sides 56A, B and C of track assembly 56 by an endless chain 70 which extends along track assembly 56 at a location below and somewhat outwardly of outer rails 68 (see particularly FIGS. 5 and 7). Chain 70 is trained around idler sprockets 72, 74 and 76 located respectively at three of the corners of the endless path. From sprocket 76, chain 70 extends around another idler sprocket 78, a take-up sprocket 80 and a drive sprocket 82. Drive sprocket 82 is driven from main drive motor 32 by structure shown in FIG. 2 which includes a drive pulley 84 coupled by a belt and pulley to an intermediate shaft 86 which is in turn coupled by chain and sprocket assembly 88 to drive a reduction gear assembly 90 whose output shaft 92 is coupled to drive sprocket 82. Tension in chain 70 is regulated by take-up sprocket 80 which is mounted at one end of an arm 94 pivotally supported upon the machine frame and resiliently biased as by springs 96 to apply the desired degree of tension to chain 70.

Form blocks 54 are driven successively along sides 56A, B and C of the rectangular path by pusher assemblies 98 mounted at uniformly spaced intervals on chain 70. Each pusher assembly 98 includes a triangular plate member 100 which is coupled to chain 70 by a vertical pivot pin 102 so that plate 100 may pivot in a horizontal plane above chain 70 about the axis defined by pin 102. As best seen in FIG. 7, pin 102 is located approximately midway along one side of the triangular plate 100. At the corner of the triangular plate opposite pin 102 a pusher roller 104 is supported on plate 100 for pivotal movement about a vertical axis and projects upwardly above plate 100 to engage lower flange 64 of a form block in the manner best shown in FIGS. 5 through 8.

Along sides 56A, B, and C of the track assembly, pusher plates 100 are guided by an auxiliary rail 106 which slidably engages the side of plate 100 upon which pivot pin 102 is supported to prevent plate 100 from rotating relative to the chain. When plate 100 slidably engages a rail 106, pusher roller 104 is maintained in a position midway along the side of flange 64 of a form block in the fashion best shown in FIGS. 5 and 7. As chain 70 is driven, the motion of the chain is transmitted through the pusher assembly 98 to drive the engaged form block in sliding movement along track assembly 56.

Pusher plates 100 and chain 70 are supported along the runs of the track by means of a rail assembly 108 fixedly mounted on the machine frame.

At each corner of the patch defined by track assembly 56, the direction of movement of form blocks 54 is shifted 90°. At the corners between sides 56A—56B and between sides 56B—56C, it is necessary to shift the engagement of pusher roller 104 from one side of form block to an adjacent side. This action is accomplished in the manner best illustrated in FIG. 8.

As the form block approaches the corner of the path, pusher plate guide rails 106 are terminated as at 110 somewhat short of the corner. Thus, as the engaged form block 54 is driven into the corner, the guiding action of rail 106 is terminated to permit plate 100 to pivot about pin 102 relative to chain 70. Since pivot pin 102 is mounted on chain 70, the axis of pin 102 travels around the corner in the smooth curve established by sprocket 72. The path of the axis of pin 102 is indicated in light broken line in FIG. 8 at 102P. The path of the axis of pusher roller 104 is indicated in a heavy broken line in FIG. 8 at 104P. As the pusher plate is carried around the corner by the continuous movement of pin 102, coupled directly to chain 70, roller 104 is prevented from further movement to the left, as viewed in FIG. 8, when the form block 54 is seated in the corner of track. Continued movement of pin 102 around the corner causes plate 100 to pivot upon the chain to the relative position shown at 100A, this pivotal movement being permitted by the disengagement of plate 100 from its guiding track 106. Continued movement of pin 102 causes further pivotal movement of plate 100 into the position shown at 100B as roller 104 is effectively rolled around the corner of form block 54 into position behind the proper side of form block 54 to drive form block along the next run of track. As roller 104 moves into position behind the form block, plate 100 engages the leading end of its guide track 106 as shown at position 100B in FIG. 8, and further movement of pin 102 along its path 102P pivots plate 100 into sliding edge engagement with the next section of guide track 106.

It will be appreciated that during the transfer of driving engagement of roller 104 from one side of block 54 to another, the block remains stationary in the corner of track. This momentary interruption in movement of form block 54 is employed during the stripping operation to be described in greater detail below.

In order to hold form block 54 firmly in the corner of the track during the above described shifting of roller 104, permanent magnets PM are mounted along the outer side of the track at each of the two front corners of the track.

During the momentary pause of form block 54 at the corner defined by the intersection of sides 56A and 56B, the stripping assembly, to be described below, strips or pulls a stocking supported upon the form from the form for further handling operations. Since the forms are slidably received in the blocks, the force exerted in pulling the sock from the form would normally be sufficient to lift the form unwardly out of bore 52 in form block 54. To prevent this action, a holding plate 112 is mounted along the end of side 56A to overlie the cross pin 55 on the form supporting rod 46 to prevent lifting of the rod upwardly from bore 52 during the stripping of the sock from the associated form.

Chain 70 is driven in a direction such that the pusher assemblies are driven successively along sides 56A, B and C of the track. When the form block being driven reaches the corner at the intersection at the sides 56C and 56D the pusher roller 104 is disengaged from the form block and, by the omission of a guide plate 106 along side 56D, the roller moves out of driving engagement with the form block and rolls down the outer of right hand side of the line of form blocks in the manner shown in FIG. 4.

Figures 9, 10:
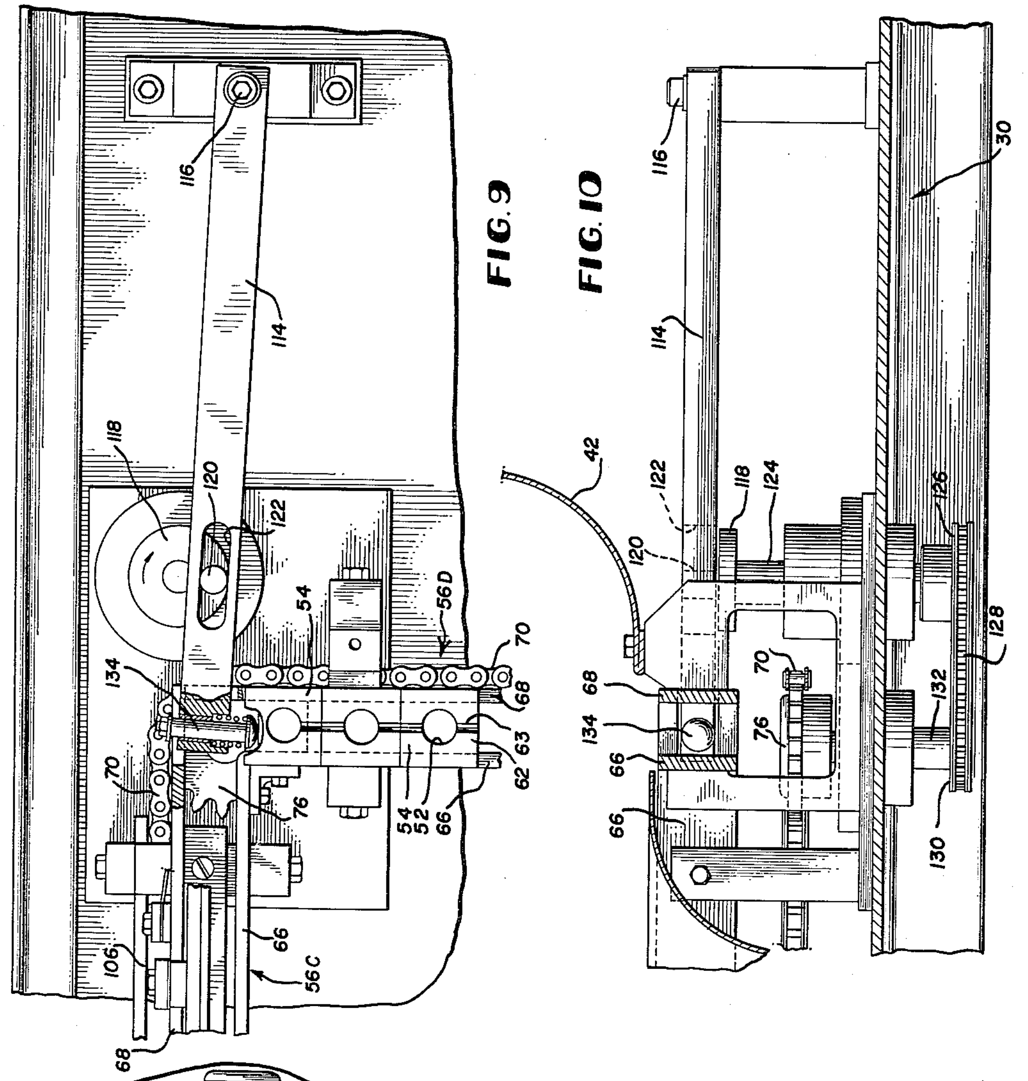
FIG. 9 is a detail plan view of the oscillating pusher arm mechanism of FIG. 4.
FIG. 10 is a detail cross-sectional view showing a side elevation of the structure of FIG. 9.

As stated above, side 56D of the track extends through the boarding chamber and, in order to afford time for the boarding of the stockings supported on the forms to take place, the forms are driven through the boarding chamber at a relatively slow step by step rate. Form blocks 54 are driven along side 56D by an oscillating pusher arm assembly best shown in FIGS. 9 and 10. This assembly includes an elongate arm 114 supported at one end for pivotal movement about a vertical axis on a pin 116. Pusher arm 114 is driven in oscillating pivotal movement about the axis of pin 116 by a rotating disk 118 carrying an eccentrically located pin 120 slidably received within an elongated slot 122 in arm 114. Disk 118 is mounted at the upper end of a shaft 124 supported for rotation in the machine frame and pinned at its lower end to a sprocket 126 driven by an endless chain 128 trained around a second sprocket 130 rigidly connected by a shaft 132 to sprocket 76. Since sprocket 76 is driven by movement of chain 70 arm 114 is oscillated about its pivot pin 116 in timed synchronized relationship with movement of chain 70.

The distal end of arm 114 is aligned to move in forward and return strokes along an arc extending generally along side 56D of the track assembly. A spring cushioned striker 134 is slidably mounted in the end of arm 114 along side 56D to drivingly engage the endmost form block upon each oscillation of arm 114 in a counterclockwise direction as viewed in FIG. 9. Continued rotation of disk 118 from the FIG. 9 position carries arm 114 in a clockwise direction about pivot 116 until the endmost form block is advanced along side 56D to a location clear of the end of side 56C of the track assembly as in FIG. 9. The foregoing movement leaves a vacant space at the intersection of sides 56C and 56D into which the next succeeding block is driven by chain 70. Movement of each block by pusher arm 114 pushes the preceding blocks along side 56D and the stroke of arm 114 is such that the line of blocks extending along side 56D is advanced to locate the leading block in the line in the corner at the intersection of sides 56D and 56A. The spacing of pusher assemblies 98 along chain 70 is such that as each form block arrives in the corner at the intersection of sides 56D and 56A, the chain carries a pusher assembly 98 into contact with the form block to advance the block along at the side 56A, thus leaving a vacant space at the corner between sides 56D and 56A (see FIG. 4). The movement of a pusher assembly 98 into contact with a block in the foregoing manner is synchronized with the oscillation of pusher arm 114 to occur while the arm is moving in a return stroke. Before arm 114 is driven in the next succeeding forward stroke, chain 70 drives a block into the intersection of sides 56C and 56D to be advanced along side 56D by the next forward stroke of arm 114.

The coupling between the form and form blocks permits the form to rotate relative to the block and also permits the forms to be easily removed from the form block as when forms of different sizes are substituted in the machine. As best seen in FIGS. 7 and 8 a V-shaped groove 63 is cut into the top surface of upper flange 62 of the form block to receive cross pin 55 to normally hold the stocking receiving form F in a position in which the toe of the form points toward the front of the machine. Guide rails such as 136 along side 56A, 138 along side 56B and 140 along side 56C slidably engage the flat side of the form to maintain the general plane of the form in the desired direction during its transit along these respective sides. During movement of the form through the boarding chamber along side 56D cross pins 55 are received in notches 63 of form blocks to maintain the form F in parallel relationship with the toes of forms pointing toward the front of the machine as seen in FIGS. 1 and 3.

During transit of side 56A of the track, the form is maintained in the same relative position as during its transit of side 56B, namely with the toe of the form pointing forwardly of the machine, and with the general plane of the form extending parallel to the direction of movement of the form along side 56A. The form retains this same orientation as it moves into the corner between sides 56A and 56B and the stripping mechanism to be described below is so oriented as to operate on the form in this position. As the form moves away from the corner 56A—56B the form is still pointing forwardly of the machine. After a slight initial movement away from the corner, the lower end of the form strikes a curved portion 142 (FIG. 3) of form guiding track 138 and, as the form is carried to the left along side 56B the form is rotated by the engagement with curve portion 142 through an angle of 90° so that the toe of the form now points in the direction in which the form is being moved along side 56B (to the left as viewed in FIG. 4). The turning of the form in the foregoing manner is of convenience in assisting the operator in placing a stocking upon the form as the form moves across the front side 56B of the track. A stocking to be boarded is normally manually placed upon the form by the machine operator during movement of the form along the first half of side 56B.

As the form approaches the left hand end of side 56B, track 138 is terminated at an end 144 and as the side of the form clears end 144, a stationary lug 146 mounted upon the frame engages the cross pin 55 of the form. As the form is driven by lug 146, the engagement between lug 146 and pin 55 of the form rotates the form through an angle of approximately 45° so that during the transit of the remaining portion of side 56B the form is oriented with the toe pointing at an angle of 45° away from its direction of movement and toward the front of the machine. As the form passes around the corner between side 56B and 56C, the initial movement of the form along side 56C carries the form into engagement with a curved end projection 148 on the leading end of form guiding track 140 which rotates the form an additional 45° to orient the form with the toe pointing forwardly of the machine and the plane of the form extending parallel to its direction of movement along side 56C.

Because of the employment of the substantially flat stocking receiving forms F an opportunity is provided to perform a trimming operation upon the stocking as it is carried by the form along the track assembly 56. The trimming operation involves the cutting of the loose or free end of yarn which dangles from the top of the stocking and is present in all stockings produced because of the characteristics of the knitting operation. In the usual case, the loose ends are manually trimmed in a separate operation.

Figure 11:
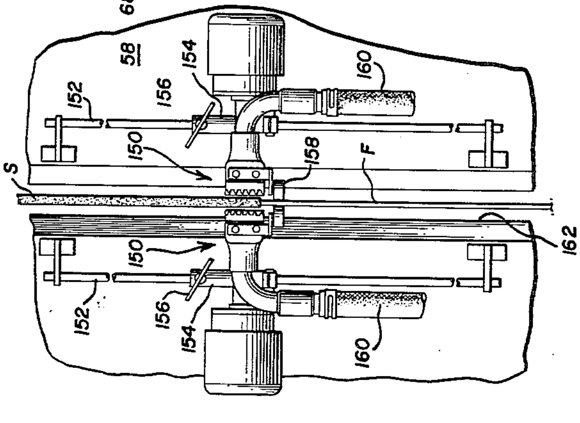
FIG. 11 is a front elevational view of the stocking trimming mechanism.

To automatically perform the trimming operation, a pair of suction clippers 150 of conventional construction are mounted upon the front side of the boarding chamber (FIGS. 1 and 11) on opposite sides of the path of travel of the form along side 56C toward the boarding chamber. The clippers are conveniently mounted upon front plate 58 by fixedly mounting a pair of rods 152 upon front plate 58 in a vertical position projected outwardly in front of plate 58. A sleeve 154 is fixedly attached to each clipper and slidably received upon the respective rods 152. A clamp screw 156 threadedly received in sleeve 154 affords a convenient means for clamping the respective clippers 150 in adjusted vertical positions in which the cutting elements of the clippers are located to trim the top of the stocking as the form passes between the opposed clippers. Rollers 158 are mounted upon the clipper heads to guide the form F in movement as it passes between the clippers. Suction lines 160 connected to the clipper heads may be connected to a suitable suction producing device (not shown) mounted within the machine cabinet. Preferably, the trimming assembly is mounted upon front plate 58 just in front of the entrance opening 162 through which the form passes into the interior of the supporting chamber. As stated above clippers 150 are of a conventional, commercially available construction well known to those skilled in the art. The suction applied through suction lines 160 extends the loose ends of the thread on the stocking supported upon form and draws the loose end into the cutting blades of the trimmer.

Figure 17:
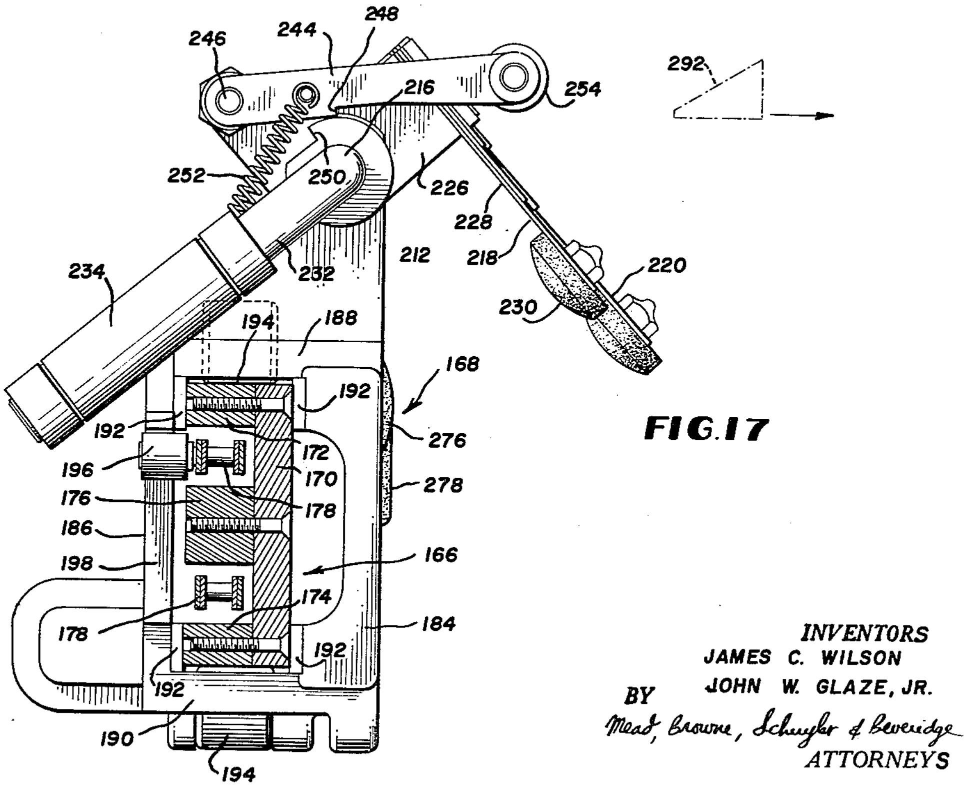
FIG. 17 is an enlarged detailed cross-sectional view taken on line 17—17 of FIG. 16.

After the forms have been conveyed through the boarding chamber, stockings are automatically stripped from the forms and collected by the stripping and collecting structure shown in detail in FIGS. 12 through 20 inclusive. The stripping and collecting structure includes a rigid frame assembly having spaced parallel upper and lower arm assemblies 164 and 166 respectively which are rigidly supported upon the machine frame in an upwardly and forwardly inclined position above the corner defined by the intersection of sides 56A and 56B of the form carrying track. Lower arm 166 serves as an inclined track upon which a sliding stripper block assembly designated generally 168 is sleeved for guided sliding movement. As best seen in FIG. 17, arm assembly 166 includes a main plate 170 lying in a generally vertical plane and upper and lower track plates 172 and 174 respectively fixedly secured to main plate 170 to increase the width of the upper and lower edges of the arm. Track plates 172 and 174 extend the entire length of the arm while a central strip 176 (FIGS. 13 and 17) extends partially up the length of arm 166 to define, with the adjacent sides of plates 172 and 174, a pair of parallel recesses within which opposite runs of an endless stripper block driving chain 178 is received. At its upper portion, lower arm 166 is formed with an elongate, generally rectangular central opening which extends between end walls 180 and 182 for purposes to be described below.

Stripper block 168 includes inner and outer side plates 184 and 186 respectively which are rigidly interconnected to each other by upper and lower side plates 188 and 190. As best seen in FIG. 17, stripper block 168 thus effectively surrounds arm 166. Nylon pads 192 are mounted upon the inner faces of side plates 184 and 186 to slidably engage the opposed sides of lower arm assembly 166. Four nylon rollers 194 are rotatably mounted in stripper block 168 to engage the upper and lower sides of the arm assembly to provide a relatively low friction support for slider block 168 on lower arm 166. Side plates 184 and 186 are constructed with several openings through the plates to reduce the weight of the slider block and to provide operating clearance for certain parts to be described below.

Block 168 is driven in movement upwardly along arm 166 by the engagement between a projecting drive pin 196 mounted upon chain 178 and the rearward surface 198 of outer side plate 186. Chain 178 is driven from a drive sprocket 200 mounted for rotation in the lower end of arm 166 which is in turn driven from intermediate drive shaft 86 (FIG. 2) by a chain and sprocket drive assembly designated generally 202. Idler sprocket 204 at the upper end of chain 178 is rotatably supported in a plate 206 mounted for longitudinal adjustment along arm 166 so that the tension in chain 178 may be adjusted as desired. Sliding block 168 moves longitudinally along lower arm 166 between the position shown in FIG. 13 and a lower position (FIG. 14) established by the abutment of the lower end 208 of inner plate 184 with a fixed abutment 210 located at the lower end of arm 166.

Figures 18, 19:
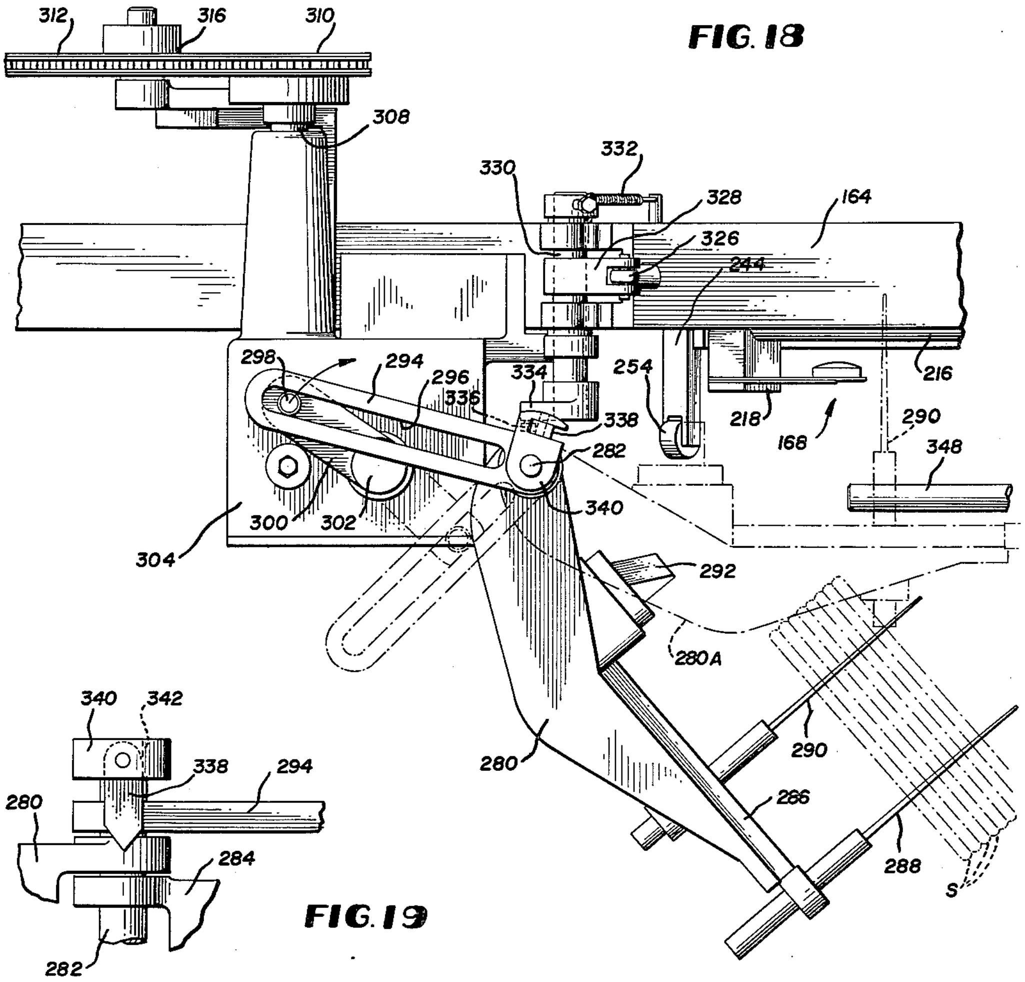
FIG. 18 is a partial top plan view of the upper portion of the stripper mechanism showing details of the collector mechanism.
FIG. 19 is an enlarged side elevational view of a portion of structure of FIG. 18.
Figure 20:
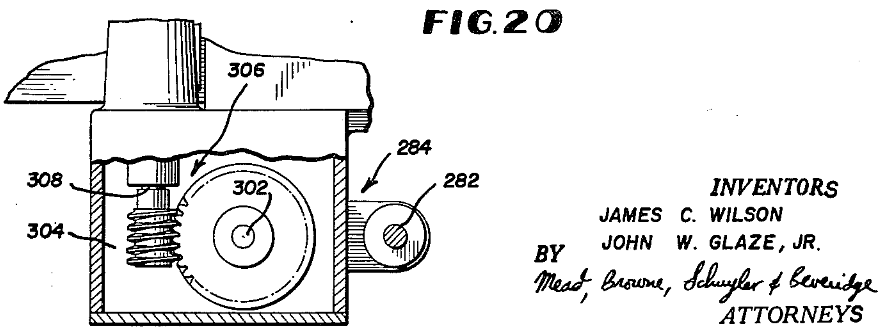
FIG. 20 is a detail top plan view, partially in section, of a portion of the collector arm driving mechanism.

Near each end of stripper block 168, upstanding lugs 212 and 214 project upwardly from upper plate 188. Lugs 212 and 214 are bored to rotatably support a gripper finger shaft 216 for rotation about an axis extending generally parallel to arm 166. A heel gripper finger 218 and a toe gripper finger 220 are clamped to shaft 216 as by clamp screws 222 and 224 respectively to permit the gripper fingers to be located at adjusted rotative and axial positions on shaft 216. Each of the gripper fingers is substantially identical and consists (FIG. 18) of a hub 226 clamped on shaft 216 by the associated clamping screw 222 or 224, a leaf spring assembly 228 usually consisting of three leafs arranged as shown in FIG. 18, and a gripper pad 230 mounted at outer end of the leaf spring assembly. In the usual case, the leaf spring assembly associated with the heel gripper finger is somewhat shorter than that employed on the toe gripper finger. Otherwise fingers 218 and 220 are substantially identical.

At its lower end, shaft 216 is bent at right angles to provide a radially projecting crank portion 232 upon which is rotatably sleeved a cam engaging roller 234. Shaft 216 is normally biased to the position shown in FIGS. 16 and 17 wherein the gripper fingers are located in their open position, inclined outwardly from stripper block 168. The biasing action is performed by a tension spring 236 (FIG. 14) coupled between heel gripper 218 and a transverse pin 238 mounted in lug 212. The open position of the fingers is established by the engagement between a cam 240 mounted upon shaft 216 and engageable, when the fingers are in their open position, with a fixed abutment 242 mounted on the top plate of stripper block.

Shaft 216 may be latched in a position in which the gripper pads of the gripper fingers are firmly pressed against inner side plate 184 of the stripper block by a spring biased latch arm 244 (FIG. 18) pivotally mounted on a projection of lug 212. The lower side of latch arm 244 is formed with a tooth 248 engageable with a cam shoulder 250 mounted upon and rotatable with shaft 216 to latch the fingers in their gripping position. Latch arm 244 is resiliently biased against cam 250 by a tension spring 252 coupled between arm 244 and pin 238. A cam engaging roller 254 is mounted at the free end of arm 244 to be engaged by structure on the collector assembly to release the latch at an appropriate time in the operation of the machine.

Figures 12, 13:
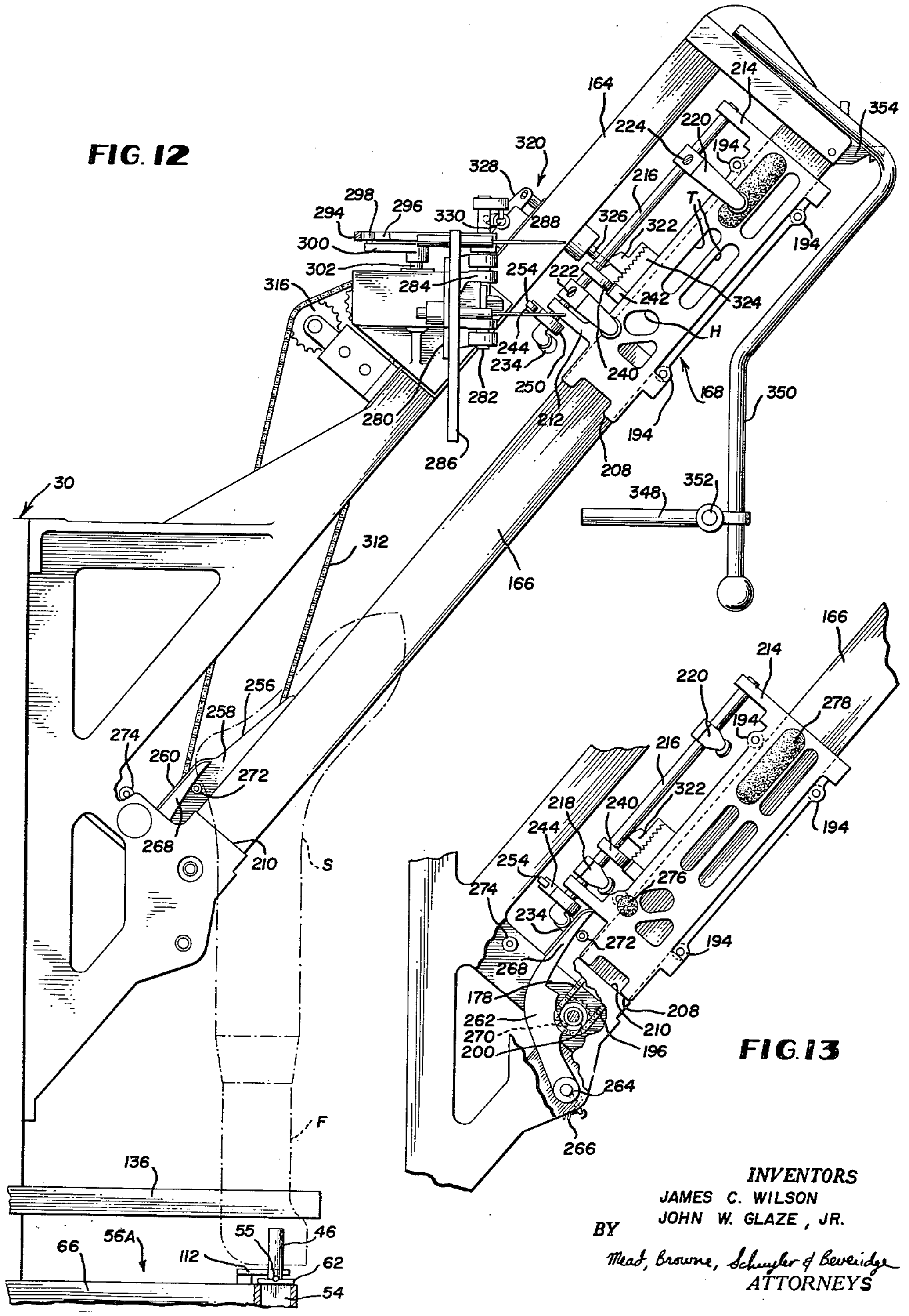
FIG. 12 is a side elevational view of the stripping and collecting mechanism showing the stripper block at one end limit of movement.
FIG. 13 is a side elevational view of the lower portion of the inclined arm of FIG. 12, showing the stripper block at its lower end limit of movement, with certain parts broken away.

Shaft 216 is rotated from the position shown in FIG. 17 to drive the gripping fingers to their gripping position by structure best shown in FIG. 13. In order to more clearly understand the operation of the closing of the gripper fingers, it will be noted at this point that the action of the machine is such that the gripper fingers are in their open position during movement of the stripper block downwardly along arm assembly 166 from the FIG. 12 position to the FIG. 13 position. Stripper block 168 slides down on assembly 166 under the action of gravity. Its rate of movement, however, is controlled by the rate of movement of drive chain 178 since pin 196 on chain 178 projects into the path of movement of the stripper block down along arm 166. As best seen in FIG. 13 the lower end 208 of block 168 moves into abutment with stationary abutment 210 at the lower end of arm 166 just prior to the passage of pin 196 around drive sprocket 200. Thus the stripper block remains stationary at the FIG. 13 position during the time period within which pin 196 is carried around sprocket 200 and back into engagement with abutment 198 (FIG. 14) of the sliding stripper block.

As stripper block 168 approaches its lower position, roller 234 of shaft 216 rides along an inclined surface 256 of a stationary cam 258 fixedly mounted in the path of roller 234. This action rotates shaft 216 slightly toward the gripper finger closed position and a further partial rotation of the shaft in this direction is accomplished when roller 234 rides up a hump portion 260 near the base of cam 258.

To drive the gripper fingers completely to their gripping position, a kicker arm 262 is pivotally supported upon a pin 264 near the lower end of arm 166. Kicker arm 262 is resiliently biased by a tension spring 266 to the position shown in FIG. 13 wherein the operative end 268 of the kicker arm lies inside and slightly below hump portion 260 of the fixed cam 258. A cam tip 270 on kicker arm 262 projects into the path of movement of pin 196 around drive sprocket 200. As pin 196 is carried around sprocket 200, it engages cam tip 270 and drives kicker arm 262 about its pivot 264 in a counterclockwise direction as viewed in FIG. 13. This action causes the operative portion 268 of the kicker arm to move upwardly to engage and rotate shaft 216 to a position wherein latch shoulder 250 is driven in a counterclockwise direction as viewed in FIG. 17 to the right of latch tooth 248 on latch arm 244. As shoulder 250 moves beyond the right of latch tooth 248, spring 252 resiliently pivots latch arm 244 to seat tooth 248 against shoulder 250 and thus hold shaft 216 in the extreme position of rotation to which it is driven by movement of kicker arm 262. Arm 262 oscillates between extreme rotated positions defined by stop abutments 272 and 274 (FIG. 13). The closing movement of the gripping fingers is synchronized with the movement of forms F along track 56 so that the foot portion of a stocking supported form is located between pads 276 and 278 on block 168 and the respective fingers 218 and 220 when the fingers are driven to their closed or gripping position. From FIG. 13 it is believed apparent that the gripper fingers will be closed before pin 196 again moves into driving engagement with stripper block 168 and thus as the stripper block is driven upwardly along arm assembly 166 by continued movement of chain 178, the stocking gripped between the gripping fingers and stripper block is pulled from the form F.

Stockings stripped from the forms F in the foregoing manner are carried to the upper end of arm 166 where the stockings are transferred from the stripper block to a collector assembly best shown in FIGS. 12, 16 and 18 through 20. The collector assembly includes an arm 280 fixed to a vertical shaft 282 (FIG. 12) rotatably supported in journals 284 formed on arm 164. At the outer end of arm 280 a rod 286 is mounted upon the arm to extend in a direction generally parallel to arm 166 when arm 280 is located at its inner position 280A shown in broken line in FIG. 18. A first collector needle 288 is fixedly mounted at the upper end of rod 286 while a second collector needle 290 is mounted upon arm 280 at a location somewhat below and to one side of needle 288. Rod 286 is slidably mounted in arm 280 so that the rod may be located at longitudinally adjusted positions relative to the arm. A clamp screw 292 in the outer end of arm 280 clamps rod 286 at selected positions of adjustment.

Needles 288 and 290 project horizontally from arm 280 to a position such that when arm 280 is located in position 280A (FIG. 18), the tips of the needles project inwardly through the openings formed in inner side plate 184 of stripper block 168 and in the upper end of arm 166. Thus, when stripper block 168 is located at its upper position, movement of arm 280 to the position 280A of FIG. 18 causes needles 290 and 288 to pierce a stocking supported by the stripper block. The length of the needles is such that the tips of the needles pass through the stocking and project approximately one inch beyond the remote side of the stocking. As the needles are moved into piercing engagement with the stocking a fixed inclined abutment 292 on arm 280 moves into engagement with roller 254 on latching arm 244 to lift the arm upwardly to disengage latch tooth 248 from shoulder 250 on shaft 216. Thus, as the needles pierce the stocking, gripper fingers 218 and 220 are automatically released so that support of the stocking is transferred from the stripper block to the needle.

Figures 14, 15:
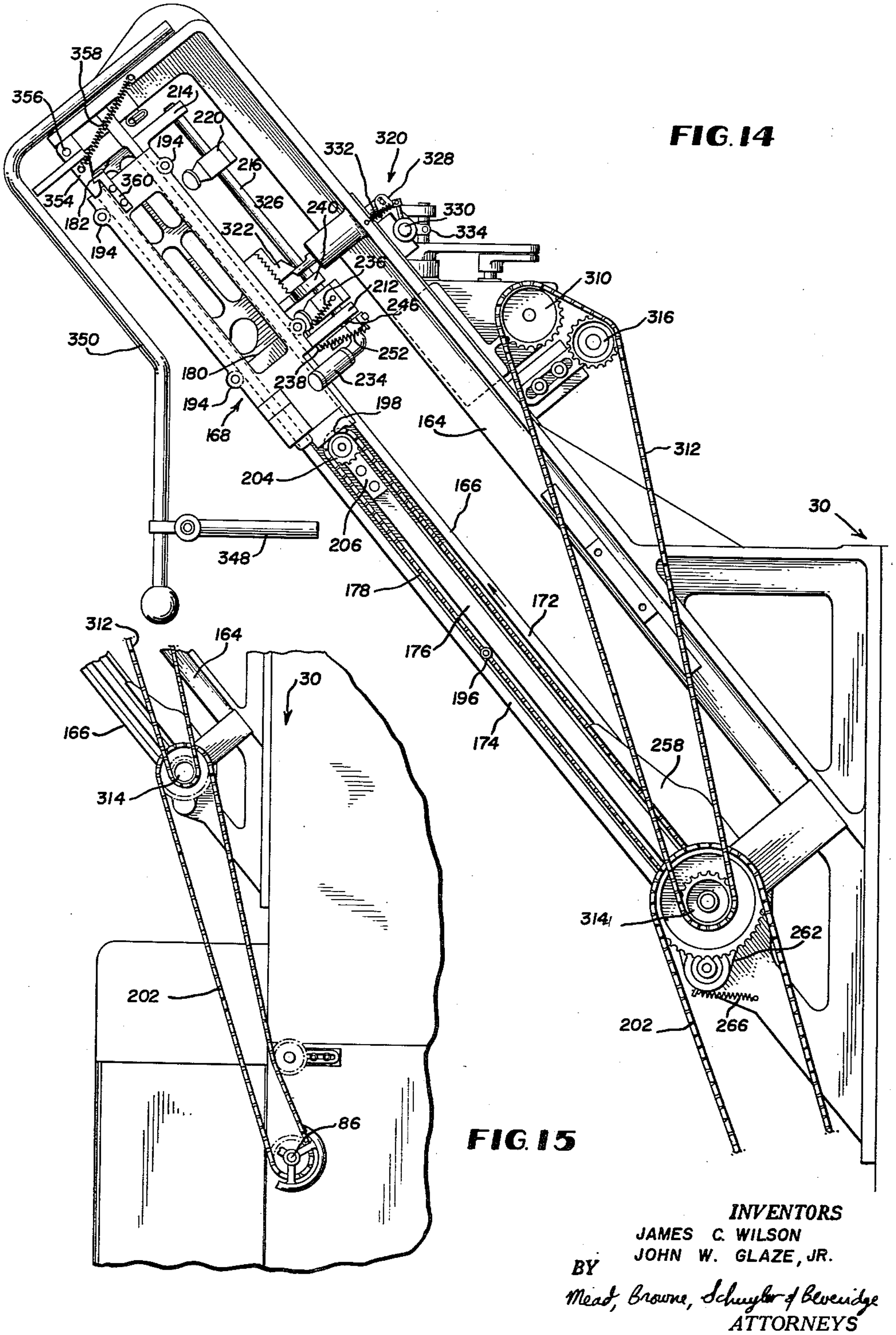
FIG. 14 is a side elevational view of the opposite side of the structure shown in FIG. 12, with certain parts broken away.
FIG. 15 is a side elevational view showing details of the drive mechanism of the structure shown in FIG. 14.
Figure 16:
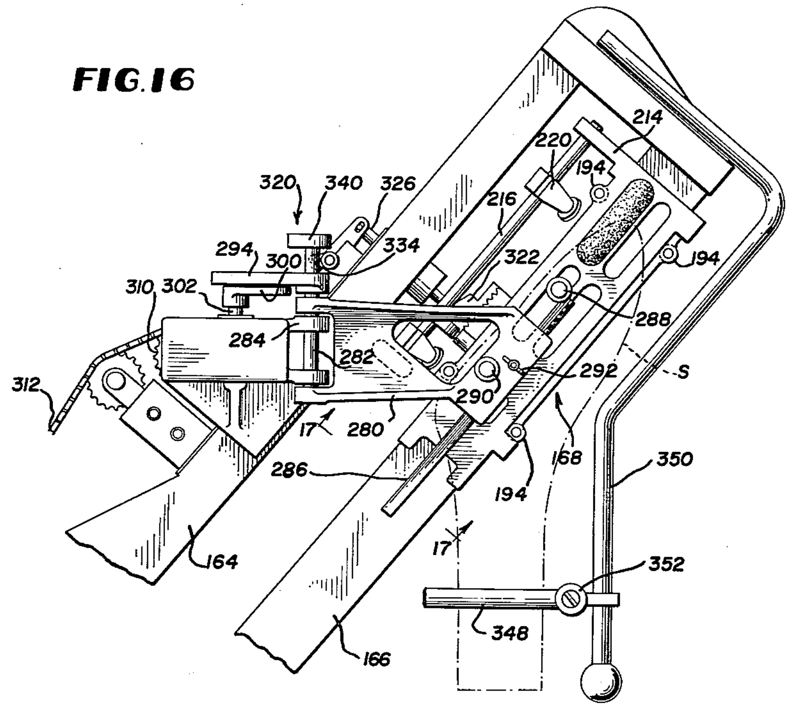
FIG. 16 is a side elevational view of the upper end of the stripper mechanism.

Arm 280 is driven in oscillatory movement about pin 282 by structure best shown in FIGS. 18 and 19. A crank 294 is rotatably fixed to shaft 282 which in turn is rotatably fixed to arm 280. A radially elongate slot 296 in arm 294 receives a drive pin 298 mounted at the outer end of a crank 300 which is fixed to and rotates with a drive shaft 302 journalled for rotation in a housing 304 formed on arm 164. Shaft 302 is driven in continuous rotation by a worm wheel assembly 306 mounted in housing 304. The worm shaft 308 is driven in synchronism with the movement of slider block 168 by a sprocket 310 which is driven by a chain 312, driven in turn from a sprocket 314 rotatably fixed to the same shaft which supports drive sprocket 200 of the stripper block driving chain assembly. Tension in chain 312 is regulated by an adjustably supported idler sprocket 316 (FIG. 14).

As best seen in FIG. 18, continuous rotation of shaft 302 and crank arm 300 in a clockwise direction as viewed in FIG. 18, continuously oscillates arm 280 between the stocking collecting position of arm 280 indicated in broken line at 280A (FIG. 18) and an extreme outer position wherein the arm projects generally perpendicularly from an arm assembly 164. Because of the geometrical relationship between crank 300 and shaft 282, the driving action of crank 300 is such that arm 280 is driven toward the collecting position at 280A at a relatively rapid rate and is driven in the opposite direction at a relatively slow rate.

The relatively slow rate of movement of arm 280 in a clockwise direction as viewed in FIG. 18 affords sufficient time for the stripper block 168 to make a round trip from the upper end of arm 166 to the lower arm and return with a stocking to the upper position shown in FIG. 12 before arm 280 is returned to position 280A.

In order to hold stripper block 168 stationary during that period of time in which the needles are passed through a stocking supported upon the stripper block and withdrawn to a position clear of the block, a latch assembly designated generally 320 is mounted upon arm 164 and controlled by the relative position of arm 280 to the stripper block. Latch assembly 320 includes a latching projection 322 mounted upon the upper side of stripper block 168. A complementary saw tooth engagement between latching projection 322 and a boss 324 on stripper block 168 permits the latch projection to be clamped at selected positions of longitudinal adjustment relative to block 168. A latch tooth 326 is slidably mounted in arm 164, projects upwardly through arm 164, and is coupled at its upper end to a crank 328 mounted for rotation with a shaft 330 rotatably supported on arm 164. A tension spring 332 is coupled between shaft 330 and arm 164 to resiliently bias latch tooth 326 to the fully extended position shown in FIG. 14 where tooth 326 is engaged beneath projection 322 to hold stripper block 168 at its upper position. At the opposite end of shaft 330, a second crank 334 is fixed to the shaft to support a roller 336 in the path of movement of a striker 338.

Striker 338 is pivotally mounted in a hub 340 at the upper end of shaft 282 for pivotal movement about an axis extending radially of shaft 282. A tangential slot 342 in hub 340 permits striker 338 to pivot freely one way away from the normal vertical position (FIG. 19) which striker 338 gravitationally assumes. Pivotal movement of striker 338 in the opposite direction from the FIG. 19 position is prohibited by the engagement between striker 338 and the inner end of slot 342. As best seen in FIG. 18 striker 338 is thus free to pivot and loosely ride over roller 336 during oscillation of arm 280 in a counterclockwise direction as viewed in FIG. 18. During movement of arm 280 in a clockwise direction as viewed in FIG. 18 striker 338 cannot pivot because of its engagement with bottom of slot 342 and hence depresses roller 336 and crank 334 to rotate shaft 330 in a direction lifting latch tooth 326 clear of engagement with latching abutment 322 on stripper block 168. Hub 340 is rotatably positioned upon shaft 282 at a location such that the depressing of crank 334 to disengage latch tooth 326 from abutment 322 occurs during movement of arm 280 away from the stripper block at a point in time when needles 288 and 290 are withdrawn to a position clear of the stripper block.

Latch tooth 326 is retracted only momentarily and after stripper block 168 has been released, latch tooth 326 returns to its fully extended position after striker 338 has passed beyond roller 336. When the stripper block is again driven to the upper position, the inclined leading surface of abutment 322 forces latch tooth 326 upwardly to permit abutment 322 to pass above the latch tooth. The upward movement of latch tooth 326 by the foregoing action is resisted by spring 332 which immediately returns latch tooth 326 to its fully extended position after abutment 322 has passed upwardly beyond the latch tooth.

As indicated in FIG. 18, continued operation of the machine collects a plurality of stockings in a flat vertical side by side relationship upon the collector needles. The needles pass horizontally through the individual socks at spaced points along the foot portion of the sock while the leg portion of the sock hangs freely downwardly. When the collector arms swings in to collect an additional stocking, the leg portions of previously collected stockings swing freely below the collector needles and, in order to avoid having the swinging portions of the accumulated stockings striking the socks supported upon the gripper, an abutment bar 348 is located to extend across the path of the accumulated stockings to prevent displacement of the stocking being collected upon the collector needles. Bar 348 is preferably supported on a rod 350 fixedly mounted at the outer end of the arm assemblies. A clamping screw 352 is employed to locate bar 348 at selected positions of vertical adjustment along rod 350.

During the initial portion of operation of the machine when stockings are initially being applied to the forms, operation of the stripper mechanism may be discontinued until forms carrying boarded stockings begin to emerge from the boarding chamber by manually latching stripper block 168 at its upper position. To accomplish this manual latching operation, a latch tooth 354 is mounted on the upper end of arm 166 for pivotal movement about a pin 356 (FIG. 14). A tension spring 358 is coupled to latch 354 to resiliently maintain the latch either in the latching position shown in FIG. 14 or the released position indicated in FIG. 12. A latch tooth 360 fixedly mounted on stripper block 168 is engaged by latch member 354 in the manner indicated in FIG. 14 to manually latch stripper block 168 in its upper position.

*Operation*

With the foregoing description of the structural elements in mind the operation of the machine will now be reviewed. As an initial condition, it is necessary to stock the machine with a supply of forms F corresponding to the size of stockings to be handled on the machine. The forms are so constructed that when the unboarded stocking is placed upon the form, the stocking is in a slightly stretched condition. Forms may be conveniently stocked into the machine by placing them in the individual blocks as the blocks are advanced toward the corner intersection between sides 56B and 56C, where a relatively enlarged opening in the form guiding structure exists near the end of side 56B. As described above, the forms are driven in spaced succession along sides 56A, 56B and 56C by pusher assemblies 98 carried by chain 70. Movement of the forms along these three sides of track assembly 56 is continuous with the exception of the momentary pause of each form at the corners at each end of side 56B as pusher roller 104 is shifted from one side of the form block to another to change the direction of driving movement of the form blocks at the respective corners.

In the usual operation of the machine, the machine operator slips a stocking to be boarded upon the form during the initial portion of movement of the form along side 56B. Trimmers 150 are continuously operated and act to trim the loose end of yarn as the form supported stocking is driven along side 56C past the trimmers and into boarding chamber 38. At the end of side 56C, the pusher assemblies on chain 70 are disengaged from the form blocks and the forms are driven through the boarding chamber along side 56D in step by step movement by the action of oscillating pusher arm 114. As stated above, the oscillation of arm 114 is synchronized with movements of the form blocks by oscillating arm 114 by a drive means driven by chain 70.

During their transit through the boarding chamber, air heated by steam coils 40 is continuously circulated past the stockings by blower 34 and the rate of movement of the forms through boarding chamber 38 is regulated to achieve the desired amount of exposure of the stockings to the steam heated atmosphere of the boarding chamber. As stated above, the number of forms and form blocks employed is such that side 56D ordinarily is completely filled with form blocks with the exception that a space for one additional form block is always present at one or the other end of side 56D. At the intersection of sides 56D and 56A, pusher carrying chain 70 moves back into operative relationship with the form blocks and carries the endmost form block along side 56A in timed relationship with the oscillation of pusher arm 114 and the arrival of a form block at the opposite end of side 56D.

As discussed above, the flat, vertically disposed forms are oriented in a plane wherein the toe portion of the form points toward the front of the machine during transit by the form of sides 56C, 56D and 56A. Thus, as each form is driven along side 56A, the general plane of the form is parallel to its direction of movement and the form arrives at the corner between sides 56A and 56B with the general plane of the form extending parallel to side 56A and the toe portion of the form pointing forwardly and, because of the configuration of the form upwardly in a generally vertical plane.

As described above, the stripping and collecting mechanisms are driven in synchronism with the movement of chain 70 so that as each form arrives at the corner between side 56A and side 56B the stripping mechanisms strip the sock from the form and transfer the sock to the collecting mechanism defined by needles 288 and 290. For the sake of clarity, a complete cycle of operation, of the stripping and collecting mechanism is set forth below in separately numbered paragraphs. Events described within a given paragraph occur substantially simultaneously while the numbering of the paragraph follows the sequence of events.

(I) As an initial condition, the cycle will be assumed to start with stripper block 168 resting against pin 196 on chain 178 and moving downwardly along arm 166 toward the lower position illustrated in FIG. 13. Gripper fingers 218 and 220 are in their opened positions. Collector arm 280 is moving in a clockwise direction as viewed in FIG. 19 at a location somewhere between position 280A of FIG. 18 and the full line position of FIG. 18. A form which, for convenience will be designated $F_1$, is being driven along side 56A of the track assembly by a pusher roller 104 on chain 70 and is approaching the corner intersection of side 56A with side 56B.

(II) Form $F_1$ arrives at the corner intersection of sides 56A and 56B and the drive pin 104 engaged with the form block 54 supporting form $F_1$ begins its shifting movement around the corner of the form block (see FIG. 8). The form block is held stationary in the corner by the adjacent permanent magnet PM while holding finger 112 overlies cross pin 55 of form $F_1$ to prevent the form from being pulled from the block during the stripping operation.

(III) Stripper block 168 arrives at its lower position (FIG. 13) with inner side plate 184 extending parallel to and closely adjacent the remote side of the stocking shown in the broken line position of FIG. 12. The opened gripper fingers are inclined downwardly across and above the uppermost edge of the stocking. Pin 196 moves out of engagement with block 168 to begin its transit around drive sprocket 200 (FIG. 13).

(IV) Pin 196 passes around sprocket 200, actuating kicker 262 to drive the gripping fingers to their closed position against the side of the stocking closest to the observer in FIG. 12. Latch 244 drops into place to hold the gripping fingers in their closed position. The stocking and form are now clamped between the gripping fingers and inner side plate 184 of stripper block 168.

(V) Pin 196 moves into engagement with stripper block 168 and drives the block upwardly along arm 166. The frictional grip between the gripping fingers, stripper block and stocking is greater than the frictional grip between the stocking and form $F_1$ and the stocking is pulled or stripped from the form as block 168 moves upwardly along arm 166. When the stocking clears form $F_1$ it is clamped between the gripping fingers and stripper block 168 in a generally flat vertical position similar to that which the stocking had when in place on the form $F_1$.

(VI) Pusher roller 104 returns into driving engagement with the form block (position 100B of FIG. 8) and drives form $F_1$ along side 56B. As form $F_1$ is driven along side 56B the machine operator will place a new stocking to be boarded upon the form.

(VII) Stripper block 168 arrives at the upper end of arm 166 and is latched at the upper end of the arm by the engagement between latch 326 on arm 164 and latching abutment 324 on stripper block 168. Pin 196 begins moving back downwardly along arm 166. Collector arm 280 begins its inward movement in a counter clockwise direction as viewed in FIG. 18.

(VIII) Arm 280 approaches position 280A of FIG. 18, driving needles 288 and 290 through the stocking clamped against stripper block 168 by the closed gripper fingers.

(IX) Arm 280 arrives at position 280A (FIG. 18). Cam 292 releases latch arm 244 and gripping fingers 218 and 220 return to their open position, thus transferring support of the sock to needles 288 and 290.

(X) Arm 280 begins to move in a clockwise direction away from position 280A of FIG. 18. Pin 196 is moving back upwardly along arm 166 and approaching upper sprocket 204.

(XI) Needles 288 and 290 move outwardly clear of stripper block 168 as pin 196 passes around sprocket 204.

(XII) Striker 338 releases latch 326 from latching abutment 324. Stripper block 168 slides downwardly along arm 166 under the action of gravity until it catches up with pin 196, now moving downwardly along arm 166. The stripping and collecting mechanism is now in the same point in its operating cycle as in paragraph I above with the next succeeding form $F_2$ now approaching the corner intersection between sides 56A and 56B.

The foregoing cycle is repeated as each form is advanced to the corner or stripping location at the intersection of sides 56A and 56B. In the usual operation of the machine, 39 forms are employed, the operator conventionally leaving every thirteenth form blank so that the twelve socks previously collected upon the collector needles may be manually removed in lots of one dozen.

The transferring of socks from the forms to the upper end of arm 166 in a generally flat vertical position and collecting or accumulating the socks in flat vertical positions in side by side relationship upon spaced parallel horizontal needles enables the machine to operate more or less independently of the length of stockings handled by the machine and substantially independently of the size of stockings. Collected stockings are easily removed from the needles in a neat, aligned bundle ready for packaging merely by grasping the collected bundle and holding it stationary as the needles move outwardly away from the stripper arm. Only minor adjustments to the position of the needles are required to accommodate for different size stockings. In the usual case, several sets of forms will be supplied with the machine, each set of forms being employed on a given size of stocking. The forms are so constructed that the heel portion of the forms of each set are located at a common position at the stripping location. In this manner, the only adjustment necessary to the machine where different size stockings are handled, other than the replacement of the forms, is to shift, if necessary the location of toe gripper finger 220 in accordance with the length of the foot portion of the stockings to be handled. The location of needle 288 may be likewise varied, if necessary, although a single position of both toe grippers 220 and upper needles 288 will ordinarily operate satisfactorily over a substantial range of stocking sizes.

As needles 288 and 290 are driven through a sock supported upon the stripper block at its upper position, they pass through enlarged openings such as H and T formed in the stripper block. To provide a backing for the stocking, the heel openings H and toe openings T used may be covered by stretching an elasticized band or cloth in front of the openings. The elasticized band "backs up" the stocking as it is pierced and assures that the collector needles are driven through the stocking. As the stockings are collected, the previously collected stockings are pushed backwardly along needles 288 and 290 as each new stocking is pierced.

While we have disclosed one embodiment of our invention, it will be apparent to those skilled in the art that the disclosed embodiment may be modified. Therefore, the foregoing description is to be considered exemplary rather than limiting and the true scope of the invention is that defined in the following claims.

We claim:

1. Stocking handling apparatus comprising a plurality of stocking receiving forms mounted for movement along a fixed path, stripping means for stripping a stocking from a form located at a stripping location upon said path and transferring the stocking to a location remote from the stripping location, means for cyclically driving said stripping means and successively advancing said forms to said stripping location in synchronism with the movement of said stripping means, and cyclically driven collecting means at said remote location driven by said driving means in movement synchronized with said stripping means to successively remove stockings from said stripping means at remote location and suspend the stockings in flat generally vertical side by side positions.

2. Stocking handling apparatus comprising a plurality of flat vertically disposed stocking receiving forms mounted for movement along a fixed path, stripping means for stripping a stocking from a form located at a stripping location upon said path and carrying the stocking in a suspended flat vertical condition to a location remote from the stripping location, means for driving said stripping means in repeated stripping and transferring cycles and for successively advancing said forms to said stripping location in synchronism with the stripping and transferring cycle of said stripping means, and collecting means at said remote location operable in synchronism with said stripping means for successively removing stockings from said stripping means at said remote location and accumulating the stockings in flat, general vertical side by side relationship.

3. Stocking handling apparatus comprising a stocking receiving form, a collector needle mounted for oscillatory movement along a path remote from said form, stripping means for gripping a stocking on said form and transferring the stocking from said form to a location in the path of said needle, means for driving said needle and stripping means in synchronized movement to cause said needle to pierce a stocking located in the path of said needle by said stripping means, and means operable subsequent to the piercing of the stocking by said needle for releasing the stocking from said stripping means to suspend the stocking in a generally flat vertical position from said collector needle.

4. Stocking handling apparatus comprising a frame, a plurality of stocking receiving forms mounted for movement upon said frame along an endless path, a collector needle mounted on said frame for oscillatory movement along a path remote from said endless path, stripping means mounted on said frame for gripping a stocking received upon a form located at a stripping location on said endless path and transferring the stocking to a location in the path of said needle, means for driving said needle and said stripping means in synchronized movement to cause said needle to pierce a stocking located in the path of said needle by said stripping means, means operable subsequent to the piercing of a stocking by said needle for releasing the stocking from said stripping means, and means for successively advancing said forms along said endless path to said stripping location in synchronism with the movement of said stripping means.

5. Stocking handling apparatus comprising a frame, a plurality of flat, vertically disposed stocking receiving forms mounted upon said frame for movement along an endless path, a collector needle mounted for oscillatory movement along a path remote from said endless path, stripping means mounted on said frame for gripping a stocking received on a form located at a stripping location on said endless path and transferring the stocking in a generally flat, vertical position to a location in the path of said needle, means for driving said needle and said stripping means in synchronized movement to cause said needle to pierce a stocking located in the path of said needle by said stripping means, means operable subsequent to the piercing of a stocking by said needle for releasing the stocking from said stripping means, and means for successively advancing said forms along said endless path to said stripping location in synchronism with the movement of said stripping means.

6. Stocking handling apparatus comprising a collector needle mounted for oscillatory movement along a path between a forward end limit and a return end limit, stocking transfer means operable to grip a stocking and locate the stocking in a generally flat vertical collecting position extending transversely across the path of said needle adjacent said forward end limit, means for driving said needle and said transfer means in synchronized cycles of movement wherein said transfer means locates the stocking in said collecting position to be pierced by said needle during movement of said needle toward said forward end limit, and means operable subsequent to the piercing of a stocking by said needle for releasing the stocking from said transfer means.

7. Stocking handling apparatus comprising a pair of spaced, generally parallel collector needles mounted for concurrent oscillatory movement along a path between a forward end limit and a return end limit between which is located a collecting station, stocking transfer means operable to grip the foot portion of a stocking and to locate the stocking at said collecting station in a suspended generally flat vertical position wherein the foot portion of said stocking extends transversely across the path of said needles adjacent said forward end limit, means for driving said needles and said transfer means in synchronized cycles of movement wherein said transfer means locates the foot portion of the stocking at said collecting station to be pierced at spaced locations by said needles during movement of said needles toward said forward end limit, and means operable subsequent to the piercing of the stocking by said needles for releasing the stocking from said transfer means to thereby suspend said stocking in a generally flat vertical position from said collector needles.

8. Stocking handling apparatus comprising an arm supported adjacent one end for pivotal movement about a vertical axis, a generally horizontal collector needle projecting from said arm adjacent the other end thereof tangentially of said vertical axis, means for oscillating said arm about said axis to drive said needle in forward and return strokes along a horizontal curved path, gripping means operable during each forward stroke of said needle for positioning a stocking in a generally flat vertical position in the path of said needle to be pierced by said needle during forward movement thereof, and means for releasing the stocking from said gripping means prior to subsequent return movement of said needle to thereby transfer support of said stocking to said collector needle.

9. Stocking handling apparatus comprising an arm supported for pivotal movement about a vertical axis, a pair of spaced generally parallel collector needles projecting horizontally from one side of said arm tangentially of said vertical axis, means for driving said arm in pivotal oscillation about said vertical axis to advance and retract said needles along a fixed path, positioning means for releasably gripping the foot portion of a stocking to suspend the stocking in a generally flat vertical position with the foot portion of said stocking extending transversely across the path of said collector needles to be pierced by said needles as said needles are advanced along said fixed path, and means responsive to the arrival of said needles at their extreme limit of advancement for releasing the stocking from said positioning means to transfer support of the stocking from said positioning means to said needles.

10. Stocking handling apparatus comprising a frame, a stripper block mounted on said frame for movement along a vertically inclined path between an upper collecting position and a lower stripping position, a flat vertically disposed stocking receiving form, means for supporting said form at said stripping position upon said frame with the foot portion of said form extending generally parallel to said vertically inclined path in adjacent side by side relationship with said block when said block is in said lower position, releasable gripping means on said block operable when said block is in said lower position to grip a stocking received on said form at said stripping location and to strip the stocking from the form upon movement of said block away from said lower position, a collector needle mounted for movement between a retracted position clear of the path of said block and an extended position wherein said needle projects transversely through a stocking gripped on said block when said block is in said upper position, means for driving said collector needle in synchronism with the movement of said block to drive said needle to said extended position when said block is located in said upper position and to retract said needle from the path of movement of said block prior to movement of said block away from said upper position, and means movable with said collector needle for releasing said gripper means upon the arrival of said needle at said extended position.

11. Stocking handling apparatus comprising a frame, a stripper block mounted on said frame for movement along a vertically inclined path between an upper collecting position and a lower stripping position, means for cyclically moving said block from said lower position to said upper position and returning said block to said lower position, a plurality of flat, vertically disposed stocking receiving forms mounted on said frame for movement along an endless path extending past said stripping position of said block, means for advancing said forms in spaced succession along said endless path to said stripping station on said endless path in synchronism with the movement of said block to locate a form at said stripping station concurrently with the arrival of said block at said lower position, means at said stripping station for positioning each form to dispose the foot portion of said form to extend in generally parallel relationship with said path in adjacent side by side relationship with said block when said block is in said lower position, releasable gripping means on said block operable when said block is in said lower position to grip a stocking supported on the form at said stripping station and to strip the stocking from the form upon movement of said block away from said lower position, a collector needle movable between a retracted position clear of the path of said block and an extended position wherein said needle projects transversely through a stocking gripped on said block when said block is in said upper position, means for driving said collector needle in synchronism with the movement of said block to drive said needle to said extended position when said block is located in said upper position and to retract said needle from the path of said block prior to movement of said block away from said upper position, and means responsive to the arrival of said collector needle at said extended position for releasing the stocking from said gripping means.

12. Stocking handling apparatus as defined in claim 11 including latch means responsive to the arrival of said block at said upper position for latching said block in said upper position, and latch release means responsive to movement of said collector needle for releasing said latch means when said needle is retracted clear of the path of movement of said block.

13. Stocking handling apparatus comprising a frame, a vertically inclined arm projecting upwardly and outwardly from said frame, a stripper block slidably mounted upon said arm for movement along said arm between an upper collecting position and a lower stripping position, a drive pin mounted upon said arm for oscillating movement along said arm between upper and lower end limits, said drive pin being operable during movement toward said upper end limit to drive said block from said lower position to said upper position and being operable during movement toward said lower end limit to control the rate of sliding movement of said block from said upper position to said lower position, means for continuously oscillating said drive pin between said upper end limit and said lower end limit to cyclically drive said block between said lower position and said upper position, a plurality of flat vertically disposed stocking receiving forms mounted on said frame for movement along an endless path to a stripping station on said path adjacent said stripping position, means on said frame for advancing said forms in succession along said endless path in synchronism with the movement of said block along said arm to locate a form at said stripping station wherein said form is disposed to lie adjacent said block when said block is in said lower position concurrently with the arrival of said block at said lower position, means on said frame for positioning a form at said stripping station to dispose a foot portion of said form generally parallel to said arm in adjacent side by side relationship with said block when said block is in said lower position, releasable gripping means on said block operable when said block is in said lower position to grip a stocking supported upon a form at said stripping station and to strip the stocking from the form upon subsequent movement of said block away from said lower position, a collector needle mounted upon said arm for movement between a retracted position clear of the path of said block and an extended position wherein said needle projects transversely through a stocking gripped on said block when in said upper position, means for driving said collector needle in synchronism with the movement of said block to drive said needle to said extended position when said block is located in said upper position and to retract said needle from the path of said block prior to movement of said block away from said upper position, and means movable with said collector needle for releasing said gripping means upon arrival of said needle at said extended position to thereby transfer support of said stocking from said gripping means to said needle.

14. Apparatus as defined in claim 13 comprising releasable latch means mounted upon said arm for latching said block at said upper position, and means for releasing said latch means after said drive pin has moved through a complete cycle of oscillation subsequent to the arrival of said block and said upper position, said means for driving said collector needle being synchronized with said means for oscillating said drive pin to move said collector needle from a position clear of the path of said block to said extended position and to retract said needle clear of the path of said block during the period in which said block is latched in said upper position by said latch means.

15. Apparatus as defined in claim 13 wherein said releasable gripping means is normally maintained in a released condition, resilient gripper latch means for latching said gripping means in its stocking gripping position, said lower end limit of said drive pin being spaced from said lower position of said stripper block whereby said pin is disengaged from said block during movement adjacent its lower end limit, and means operable by said drive pin during that portion of its movement wherein said drive pin is disengaged from said block adjacent said lower end limit for shifting said gripping means from its released position to its stocking gripping condition.

16. Apparatus as defined in claim 15 including latch means mounted at the upper end of said arm operable upon arrival of said block at said upper position for latching said block in said upper position to thereby disengage said block from said pin as said pin moves downwardly along said arm from said upper end limit, means for maintaining said latch means engaged to latch said block in said upper position until said pin is returned to said upper end limit, said means for driving said collector needle being synchronized with the operation of said latch means to move said collector needle from a position clear of path of said block to said extended position and to retract said needle clear of the path of said block during the period in which said latch means is engaged.

17. Stocking handling apparatus comprising means defining a boarding chamber, a plurality of flat, vertically disposed stocking receiving forms, conveying means for driving said forms in movement along an endless path having a portion thereof extending through said boarding chamber, opposed trimming means mounted upon opposite sides of the path of movement of said forms at a location adjacent the exterior of said chamber for trimming a stocking supported upon a form as the form is driven past the trimming means, cyclically actuable collecting means at the exterior of said chamber for successively collecting and suspending stockings in a flat vertically disposed side-by-side relationship at a location remote from the path of movement of said forms, and cyclically actuable stocking transfer means driven in synchronism with said conveying means and said collecting means and mounted at the exterior of said chamber adjacent the exit of said path from said chamber for stripping a stocking from a form subsequent to the passage of the form through said chamber and transferring the stocking to said collecting means.

18. Apparatus as defined in claim 17 wherein said collecting means comprises a pair of parallel horizontal collecting needles, and means for cyclically moving said needles to pierce each stocking transferred to said remote location by said transfer means and to successively collect stockings from said transfer means to assemble collected stockings in a group wherein said stockings are suspended upon said needles in flat generally vertical side by side relationship.

19. Stocking handling apparatus comprising a stocking receiving form, means for stripping a stocking from the form and transferring the stocking to a location remote from said form, collecting means for removing the stocking from said stripping means at said remote location and suspending the stocking from its foot portion in a flat vertically disposed condition, and drive means for driving said stripping means and said collecting means in synchronism with each other.

20. Stocking handling apparatus comprising a flat vertically disposed stocking receiving form, means engageable with the foot portion of a stocking received upon said form for stripping the stocking from said form and carrying the stocking in a suspended flat condition to a location remote from said form, collecting means for removing the stocking from said stripping means at said remote location and suspending said stocking from its foot portion in a flat vertically disposed condition, and means for driving said stripping means and said collecting means in synchronism with each other.

21. Stocking handling apparatus comprising means defining a boarding chamber, a plurality of stocking receiving forms, conveying means for driving said forms in movement along an endless path having a portion thereof extending through said boarding chamber, collecting means mounted at the exterior of said chamber cyclically actuable to successively collect and suspend stockings in flat vertical side-by-side relationship at a location remote from the path of movement of said forms, cyclically actuable stocking transfer means mounted at the exterior of said chamber adjacent the exit of said path from said chamber for stripping a stocking from a form subsequent to the passage of the form through said chamber and transferring the stocking to a collecting location in operative relationship with said collecting means, and synchronized drive means for correlating the actuation of said collecting means and said transfer means with said conveying means to actuate said transfer means to strip a stocking from a form upon the arrival of the form at a selected location on said endless path and to actuate said collecting means to collect the last mentioned stocking from said transfer means upon the arrival of said transfer means at said collecting location.

22. Stocking handling apparatus comprising a frame, a plurality of stocking receiving forms mounted on said frame for movement along a given path, an arm on said frame having one end located adjacent said path and having its other end remotely located relative to said path, drive means for successively advancing said forms to a stripping station on said path at which the foot portion of a form is located adjacent said one end of said arm, stripping means movably mounted on said arm for stripping a stocking from a form located at said stripping station and carrying the stocking to a collecting station located adjacent said other end of said arm, collecting means at said collecting station actuable to collect a stocking from said stripping means when said stripping means is at said collecting station and to support a plurality of collected stockings in flat generally vertical side-by-side relationship with each other, means for cyclically moving said stripping means between said stripping station and said collecting station in synchronism with the movement of said forms along said path to strip stockings from said forms in succession as said forms are advanced in succession to said stripping station and to carry each stocking to said collecting station prior to the stripping of a stocking from the next successive form, and means for cyclically actuating said collecting means in synchronism with the movement of said stripping means to said collecting station to collect said stockings from said stripping means as they are successively carried to said collecting station by said stripping means.

23. Stocking handling apparatus comprising a frame, a stripper assembly mounted upon said frame for movement along a fixed path between a stripping station and a collecting station, means for cyclically moving said stripper assembly along said path from said stripping station to said collecting station and from said collecting station to said stripping station, a plurality of stocking receiving forms, conveying means for moving said forms in succession along a given path on said frame in synchronism with the movement of said stripper assembly to locate the foot portion of a form adjacent said stripping station when said stripper assembly is at said stripper station, gripping means on said stripper assembly for gripping the foot portion of a stocking received upon a form having its foot portion located adjacent said stripping station and for stripping the stocking from said form upon movement of said assembly away from said stripping station, collecting means at said station actuable to collect a stocking from said gripping means when said stripper assembly is at said collecting station and for suspending a plurality of collected stockings in flat generally vertical side-by-side relationship with each other, and means for cyclically actuating said collecting means in synchronism with the movement of said stripper assembly.

References Cited in the file of this patent

UNITED STATES PATENTS

| | | |
|---|---|---|
| 1,126,619 | Coulston et al. | Jan. 26, 1915 |
| 2,154,369 | Wanamaker | Apr. 11, 1939 |
| 2,221,669 | Brewin | Nov. 12, 1940 |
| 2,506,910 | Wagener | May 9, 1950 |
| 2,641,120 | Bailey | June 9, 1953 |
| 2,761,221 | Berry | Sept. 4, 1956 |
| 2,856,109 | Richter | Oct. 14, 1958 |

FOREIGN PATENTS

| | | |
|---|---|---|
| 589,973 | Great Britain | July 4, 1947 |

UNITED STATES PATENT OFFICE

CERTIFICATE OF CORRECTION

Patent No. 3,054,542 September 18, 1962

John W. Glaze, Jr., et al.

It is hereby certified that error appears in the above numbered patent requiring correction and that the said Letters Patent should read as corrected below.

Column 14, line 41, after "at" insert -- said --; column 20, line 23, for "stripper", second occurrence, read -- stripping --; line 29, after "said" insert -- collecting --.

Signed and sealed this 15th day of January 1963.

SEAL)
ttest:

RNEST W. SWIDER
ttesting Officer

DAVID L. LADD
Commissioner of Patents